Patented May 6, 1924.

1,492,969

UNITED STATES PATENT OFFICE.

ALBERT ERNEST DUNSTAN, OF SUNBURY ON THAMES, ENGLAND.

TREATMENT OF LIQUID HYDROCARBONS.

No Drawing.   Application filed May 4, 1923.  Serial No. 636,731.

*To all whom it may concern:*

Be it known that I, ALBERT ERNEST DUNSTAN, a subject of the King of Great Britain and Ireland, residing at Meadhurst, Cadbury Road, Sunbury on Thames, England, have invented certain new and useful Improvements Relating to the Treatment of Liquid Hydrocarbons, of which the following is a specification.

This invention relates to a process for treating cracked gasoline and removing the impurities therefrom. It is well known that cracked gasoline obtained from cracking hydrocarbons contains unsaturated bodies and undefined colloidal impurities, and it is also well known that chemical treatment must be resorted to in order to render the cracked gasoline acceptable and utilizable. For well known reasons, sulphur compounds and a considerable portion of the unsaturated hydrocarbons must be removed. This has usually been accomplished by treating the cracked gasoline with sulphuric acid and often by blending with it, straight distilled gasoline. The present invention has among its objects to neutralize the excess chlorine and withdraw the aqueous solution, and avoid the expense and the loss resulting from the usual method of refining the cracked gasoline by treatment with sulphuric acid, and to produce a new motor fuel having a high detonation value.

The invention comprises the process and the product thereof.

According to the invention the spirit is treated in the liquid state with chlorine water or an aqueous solution of hypochlorous acid. It is then treated with alkali to neutralize the chlorine. By the first treatment the unsaturated bodies are converted into chlorhydrins and other bodies of the same character, while in the reaction resulting from the second treatment these bodies become olefine oxides. By such treatment a liquid motor fuel is produced consisting of paraffins and other saturated hydrocarbons and oxygenated compounds.

In carrying the invention into effect chlorine may be used in any convenient form. Advantageously a solution of hypochlorous acid may be used and the cracked spirit washed with the solution. Instead of hypochlorous acid an acidified hypochlorite may be used. By such means a new and useful fuel is produced from cracked spirit without the loss that usually attends the present method of treating it with sulphuric acid.

It will be understood that malodorous components of the cracked spirit, such as sulphur and nitrogen compounds, are oxidized by the hypochlorous acid, so that the bad smell of the original gasoline is destroyed.

Alternatively the reaction products of the olefine bodies may be isolated after steam distillation and may be converted into their oxides by hydrolysis with strong alkali.

In highly cracked gasoline, particularly certain vapour phase products the high content of di-olefine bodies is responsible for the production of chloro derivatives which are difficult to hydrolyze. In such a case preliminary treatment is advisable before chlorination. Thus filtration through a mineral adsorbent such as bauxite, treatment with anhydrous aluminium or zinc chlorides or with mineral acid will bring about the polymerization of the more active unsaturated hydrocarbons.

In a particular case a pressure distillate gasoline containing 0.3% of sulphur was treated with aqueous hypochlorous acid (normal strength=35.5 gms chlorine per litre) until no more chlorine was absorbed. The product was gently boiled with dry slaked lime until samples indicated that chlorine had been substantially eliminated. The spirit was then distilled off and had a sweet odour and was practically free from sulphur. The original gasoline absorbed 14 per cent of chlorine.

I claim:

1. The process of treating cracked gasoline and removing the impurities therefrom consisting in treating said cracked gasoline with chlorine and then separating the gasoline from the impurities.

2. The process of treating cracked gasoline and removing the impurities therefrom, consisting in treating said cracked gasoline with chlorine, then neutralizing the excess chlorine and finally separating the gasoline from the impurities.

3. The process of treating cracked gasoline and removing the impurities therefrom, consisting in treating said cracked gasoline with chlorinated water, then treating the gasoline with an alkali to neutralize the excess chlorine and finally separating the gasoline from the impurities.

4. The process of treating cracked gasoline and removing the impurities therefrom, consisting in treating said cracked gasoline with chlorine, then treating the gasoline with an alkali to neutralize the excess chlorine and finally separating the gasoline from the impurities by distillation.

5. A motor fuel resulting from the treatment of cracked gasoline with chlorine to precipitate the impurities and then subjecting the cracked gasoline to treatment with an alkali to neutralize the excess chlorine.

ALBERT ERNEST DUNSTAN.